2,916,525
PROCESS OF RECOVERING POLYHYDRIC ALCOHOLS

Johann Giesen, Haldenstein, near Chur, and Fritz Mueller, Chur, Switzerland, assignors to Inventa, A.G. fuer Forschung und Patentverwertung, Zurich, Switzerland No Drawing. Application September 4, 1957
Serial No. 681,896

1 Claim. (Cl. 260—637)

The present invention relates to a process for recovering polyhydric alcohols. Up to the present the separation of polyhydric alcohols was mostly effected by fractional distillation at atmospheric or reduced pressure. According to a recent proposal, gylcerine is isolated from a mixture of polyhydric alcohols by allowing it to crystallize at temperatures below 0° C. in the presence of alcohols, e.g. ethylene glycol or butanol, whereupon the crystals of glycerine are washed with acetone.

It has also been suggested to purify aqueous glycerine, which contains acidic or basic impurities, by the use of ion exchangers.

However, the mentioned processes, such as distillation and crystallization from solvents, are difficult to operate and very expensive.

It is the object of the present invention to overcome the above mentioned drawbacks of known methods and to provide a simple and inexpensive process for the recovery or separation, purification and concentration of polyhydric alcohols.

According to the invention the alcohols are recovered from their solutions by absorbing the individual alcohol, after preliminary treatment with a complex-forming compound, by means of absorptive agents and thereafter desorbing them from the absorbent, singly or in mixture, by means of solvents, e.g. alcohols.

As absorptive agent or absorbent, we may use an ion exchanger, e.g. activated charcoal, kieselguhr, or other known absorbents. As complex-forming substances we mention for instance borax, boric acid, copper, zinc, aluminum, silver, and others, in the presence of ammonia or alkali metal hydroxides.

According to the invention we may proceed by first impregnating the absorbent with the complex-forming substance, which is in aqueous solution, and washing off the excess of the complex-forming substance. When ion exchangers are used as absorbents, they may be activated in a known manner by treatment with alkalies or acids. The so prepared absorbent is then treated with the aqueous solution of polyhydric alcohols. This may be done in a known manner by having the absorbent arranged in stationary columns, through which the alcohol solution is made to pass. The rate of flow through the columns can be regulated by application of pressure or vacuum. Alternatively the absorption may be effected by suspending the absorbent in the aqueous solution of the alcohol, while stirring. Of course, other known absorption methods may be likewise applied.

It has been found that by treating a mixture of aqueous alcohols with an absorbent impregnated by complex-forming substances, the absorption will occur mostly with high selectivity. Thus, in an ion exchanger IRA 400 (registered trademark; anion exchanger with aromatic matrix and basic ammonium groups as active agent) glycerine is absorbed from a mixture of glycerine and ethylene glycol, while ethylene glycol remains in solution. Ethylene glycol may be absorbed in a second stage.

From a mixture of glycerine, 1,2-propylene glycol, and ethylene glycol, the alcohols can be absorbed in consecutive operations. When it is intended to separate the mixture of polyhydric alcohols as it is obtained, e.g. in glycerine formation from sugar, the aqueous solution of the mixture can be treated in several stages with absorbents, until all alcohols are absorbed from the solution. The alcohol so separated can be dissolved from the absorbents, whereupon these may be used again. As soon as the activity of the absorbents decreases, they may be regenerated in a known manner by reimpregnation with complex-forming substances.

In a few absorbents there is no marked selectivity, so that a separation of several polyhydric alcohols cannot be accomplished from just any solution. This applies particularly when after absorption of an alcohol component from a solution of a mixture, the absorbent used is not fully charged. In this case the remaining absorptive capacity of the absorbent is made use of for the absorption of a second polyhydric alcohol. In order to obtain a separation also in the case when the absorbents are not particularly selective, it is possible to replace the undesired component from the absorbent by addition of a further amount of dissolved mixture. The capacity of the absorbent may also be limited to the absorption of the desired alcohol, by using an amount of absorbent which corresponds to that alcohol only.

On the other hand, the use of an absorbent which is not selective, makes it possible to absorb a mixture of all alcohols, if the amount of absorbent is sufficient for all components; this is a simple way of eliminating the other impurities from the mixture, which can then be dissolved from the absorbent in a desired solvent. Thus, a mixture of polyhydric alcohols can be absorbed from an aqueous solution by active charcoal impregnated with borax, and is then desorbed from the charcoal with an alcohol. Another way is to absorb the mixture of alcohols from a cold solution and desorb with the same solvent in the heat, whereby a concentration can be accomplished.

The alcohols desorbed by solvents may be recovered in pure state by evaporation. The evaporation of these alcohol solutions may be dispensed with, when solvents are used which mix with the alcohols at elevated temperatures, while at normal temperature no or only slight mixing will take place. The desorption can under these circumstances be carried out at elevated temperature, whereafter the solutions of the individual alcohol have only to be cooled in order to effect a separation of each polyhydric alcohol and the solvent.

The solvents may be circulated without previous distillation and are thus used again, so that a quantitative recovery of the alcohols separated by absorption can be combined with a very low consumption of solvents. As examples of solvents which dissolve polyhydric alcohols at elevated temperature, but only sparingly or not at all at normal temperature, we mention methanol, amyl alcohol, etc., or esters, e.g. ethyl acetate or butyl acetate.

The extent to which different absorbents are charged depends on their structure and surface, on the one hand, on the absorption conditions, on the other hand. Ion exchangers which have, for instance, been impregnated with borax, absorb up to 30% of their weight of polyhydric alcohols at normal temperature. The capacity of absorption depends on the molecular size and the constitution of the polyhydric alcohols, and more particularly on the type of absorbent and the selectivity of the complex-forming substance with respect to the alcohols.

The temperature of the operation is of comparatively minor influence.

The mixture of polyhydric alcohols may contain the alcohols in any desired concentration and in any ratio, without influencing the selectivity of the different absorption stages.

Thus, for instance, glycerine will always be selectively absorbed in the first stage when present with ethylene glycol, the ratios of glycerine: ethylene glycol being varied from 1:25 to 25:1; however, the concentration influences the absorptive capacity as far as the charge is concerned, that is to say, from a diluted solution less alcohol is absorbed per unit of absorbent, than from a concentrated solution.

Without having been treated with complex-forming substances, the absorbents do not retain any amount of alcohol, or at least not any practically significant amount.

The invention will now be more fully described in a number of examples, but it should be understood that these are given by way of illustration and not of limitation and that many changes in the details can be made without departing from the spirit of the invention.

Parts are given by weight except where otherwise stated.

*Example 1*

The solution of 50 parts sorbite and 50 parts glycerine in 1000 parts water is passed through a column charged with 500 parts ion exchanger Amberlite IRA 400 (registered trademark; anion exchanger having an aromatic matrix and basic ammonium groups as active agents). The ion exchanger has been previously activated with concentrated borax solution and washed, until the rinsing water is free of borax. A second column is further charged with 250 parts of the same activated ion exchanger. After having passed the first column, the solution is practically free of sorbite, after having passed the second column, it is free of glycerine. Sorbite is dissolved from the first column by methyl alcohol of about 60° C. and crystallized by cooling. Glycerine is dissolved by amyl alcohol at about 60° C. from the second column and separates at low temperature as bottom layer and is so removed. Methanol and amyl alcohol may be used again without purification.

*Example 2*

A mixture of 25 parts glycerine and 25 parts ethylene glycol in 100 parts water is passed through a column containing 125 parts ion exchanger, IRA 400, as in Example 1. The ion exchanger has again been activated with concentrated borax solution and washed as described in Example 1. After passage through the column the remaining solution of ethylene glycol is practically free of glycerine.

*Example 3*

A mixture of 50 parts 1,2-propylene glycol and 50 parts ethylene glycol in 1000 parts of water is passed through a column containing 400 parts of the ion exchanger Dowex 1 x 8 (registered trademark; anionic exchanger with a matrix of polystyrene and basic ammonium groups as active agents). The ion exchanger was previously activated with concentrated borax solution and washed as described in Example 1.

After having passed the column, there remains a solution of ethylene glycol which is practically free from 1,2-propylene glycol. The latter may be extracted with isopropyl alcohol from the ion exchanger and recovered as residue by distillation.

*Example 4*

The ion exchanger Amberlite IRC 50 (registered trademark; cation exchanger made of a polyacrylic acid derivative) is treated with an ammoniacal cupric salt solution and washed free of alkaline. 100 parts of the so-prepared cation exchanger are treated in a column through which 2000 parts of an aqueous glycerine solution are passed which contains 280 parts glycerine. The latter is absorbed in the ion exchanger.

*Example 5*

The ion exchanger Lewatit MN (registered trademark; anion exchanger with polystyrene matrix and basic ammonium groups as active agents) was activated with concentrated borax solution and washed. 100 parts of the so treated material absorbed 12.5 parts ethylene glycol from 200 parts of a 10% aqueous ethylene glycol solution. The ethylene glycol can be extracted with ethyl acetate at raised temperature and separates out in the cold.

*Example 6*

100 parts of active charcoal are treated with 10% caustic soda solution, are then activated with concentrated borax solution and washed, until the rinsing water is free of borax. The so treated active charcoal absorbs 11.5 parts of a mixture, consisting of an aqueous solution of glycerine and ethylene glycol which contains 50 parts glycerine and 50 parts of ethylene glycol per 1000 parts of water. The absorption occurs at the ratio of about 1:1 by weight. The absorbed mixture is extracted with methyl alcohol and recovered as distillation residue.

*Example 7*

The cation exchanger IRC 50 (see Example 4) is acticated with (a) Aluminate solution
(b) Zincate solution
(c) Borax solution
(d) Ammonical Cu salt solution and washed until the rinsing water is neutral. 100 parts of the so treated ion exchanger absorbed from an aqueous glycerine solution containing 100 parts of glycerine per 1000 parts of water, the following amounts of glycerine (a) 15.6 parts glycerine
(b) 15.6 parts glycerine
(c) 17.4 parts glycerine
(d) 27.5 parts glycerine

*Example 8*

An aqueous solution of the following composition is to be worked up:

(1) 11% sorbite
(2) 5% glycerine
(3) 8% 1.2-propylene glycol
(4) 5% ethylene glycol 1000 parts of this solution is passed through columns which contain ion exchangers previously treated with concentrated borax solution and water:

The 1st column contains 1100 parts b./w. IRA 400
The 2nd column contains 275 parts b./w. IRA 400
The 3rd column contains 580 parts b./w. Dowex 1 x 8
The 4th column contains 410 parts b./w. Lewatit MN The final solution discharged from the fourth column is practically free of the above polyhydric alcohols.

Extraction of the individual separated alcohol components from the exchanger is accomplished as described in the previous examples.

*Example 9*

Kieselguhr is pretreated with 10% caustic soda solution and concentrated borax solution and is washed until the rinsing water is free of borax; a suspension is then made with a solution containing 8.5% glycerine and 10% ethylene glycol. 100 parts of kieselguhr absorb 4.5 parts glycerine and ethylene glycol. The separation of kieselguhr from glycol solution is done by filtration.

*Example 10*

A 4% solution of sorbite in methanol is passed through a column charged with the ion exchanger IRA 400 (see Example 1), previously activated with concentrated borax solution and water. 100 parts of the treated ion exchanger absorb 23 parts of sorbite from 575 parts of the above sorbite solution so that a practically sorbite free solution is obtained.

What we claim is:

A process for the recovery of polyhydric alcohols selected from the group consisting of sorbitol, glycerol, ethylene glycol, propylene glycol and mixtures thereof, in solution, and for their separation from each other, which comprises absorbing said alcohols in absorbents selected from the group consisting of ion exchangers, activated charcoal and kieselguhr, said absorbents having previously been treated with a complex-forming substance selected from the group consisting of zinc, copper, silver and aluminum, in the presence of an alkaline substance selected from the group consisting of alkali hydroxides and ammonia; and thereafter desorbing said alcohols by means of solvents, selected from the group consisting of lower aliphatic monohydric alcohols and their acetic acid esters.

References Cited in the file of this patent

Zager et al.: Ind. Eng. Chem., vol. 43, pp. 1070–3 (1951).
Khym et al.: J. A. C. S., vol. 74, pp. 2090–4 (1952).
Khym et al.: J. A. C. S., vol. 75, pp. 1339–42 (1953).